Oct. 20, 1931.   W. A. CHRYST   1,828,358
SHOCK ABSORBER
Filed Dec. 9, 1929

Inventor
WILLIAM A. Chryst
By Spencer, Hardman and Fehr
His Attorneys

Patented Oct. 20, 1931

1,828,358

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed December 9, 1929. Serial No. 412,733.

This invention relates to improvements in knuckle joints particularly adapted for use on shock absorber connecting links for motor vehicles.

It is among the objects of the present invention to provide a self-lubricating knuckle joint for a shock absorber operating link.

Another object of the present invention is to provide a knuckle joint of simple structure and design, adapted automatically to compensate for wear and which may readily be assembled at a minimum expenditure of time and material.

Further objects and advantages of the present invention will be apparent from the following description, reference being had to the accompanying drawings, wherein a preferred embodiment of one form of the present invention is clearly shown.

Figure 1:
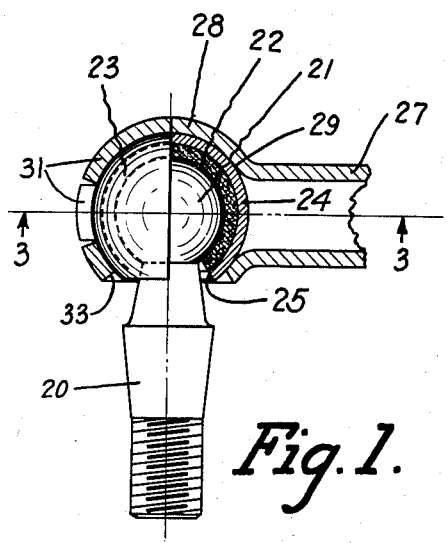
Fig. 1 is a fragmentary sectional view of a knuckle joint for a shock absorber operating link, certain portions thereof being shown in elevation for the sake of clearness.
Figure 2:
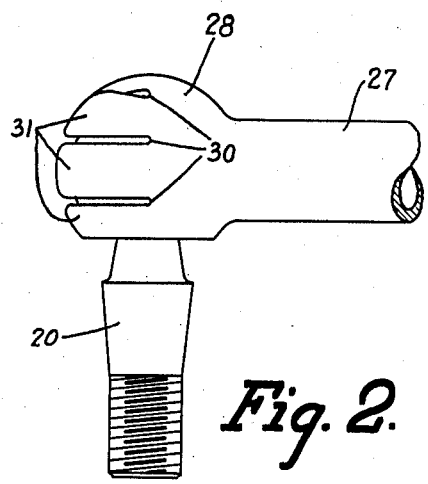
Fig. 2 is a view similar to Fig. 1, the joint, however, being shown in elevation in this view.
Figure 3:
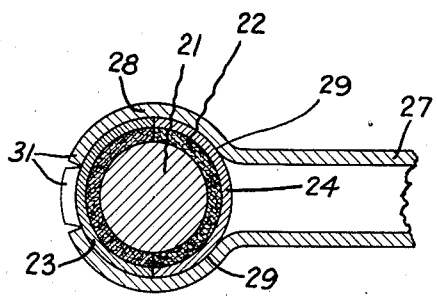
Fig. 3 is a sectional view taken along the line 3—3 of Fig. 1.

Referring to the drawings, the numeral 20 designates a stub shaft member having a spherically shaped end 21. A fibrous lining 22 covers the spherically shaped end 21 of the member 20, this fibrous lining being of any suitable wear-resisting material impregnated with any suitable lubricant such as graphite or the like.

Two spherically shaped shells 23 and 24 surround the fibrous lining 22, each shell portion being provided with a cut-away portion forming the opening 25 through which the member 20 extends. Opening 25 aligns also with a similar opening in the lining 22. The shell member 23 is shown in elevation in Fig. 1, while shell member 24 is shown in sectional view.

The link for the shock absorber is of tubular formation, preferably made up from sheet metal, and comprises the main body portion 27 and enlarged tubular ends 28, only one of which is shown. A curved inner shoulder 29 is formed between the main body portion 27 of the link and the enlarged tubular end 28 thereof, said curved shoulder 29 coinciding with the curvature of the spherical shell member 24 which, as shown in Fig. 1, is adapted to fit against said curved shoulder 29. At the outer end of the enlarged tubular portion 28 of the link there are provided slots 30 which form tangs 31. These tangs are adapted to be formed or bent upon the spherical shell member 23 when it is properly assembled within the tubular end 28 so that said tangs urge said shell member 23 into engagement with the fibrous covering 22 and in turn urge the shell member 24 against the shoulder 29 and the fibrous lining 22 against this shell member. Tangs 31 maintain the assembly including the shell members 23 and 24, the fibrous lining 22 and the ball or spherical end 21 of the member 20 within the enlarged portion 28 of the link, the member 20 being movable, swivelly, relative to the lining 22, which, being impregnated with a lubricant, substantially requires no attention from the operator. The clamping effect of the shell members 23 and 24 upon the fibrous material 22 will have a tendency to compress the same, and, if any wear should occur, said fibrous material will expand automatically to compensate therefor, and thus rattling in this type of joint is substantially eliminated.

As shown in the Fig. 1, the enlarged portion 28 of the link has an opening 33 coinciding with the opening 25 formed within the shell members 23 and 24 through which the member 20 extends into the interior of said portion 28.

Applicant has provided a link of simple structure and design, adapted to be assembled with a minimum expenditure of time and material, said link, as mentioned before, being self-lubricating and self-compensating for wear.

Figure 4:
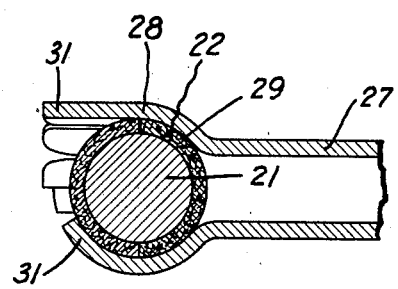
Fig. 4 illustrates in sectional view a modified form of joint. Certain of the tangs are shown not formed about the fibrous material, but in their original positions.

As shown in Fig. 4, shells 23 and 24 might be eliminated, the fibrous material 22 being adapted to fit against the curved shoulders 29 formed within the link and the tangs 31 in turn formed or bent upon the fibrous material 22, urging said fibrous material into gripping engagement with the ball end 21 of the member 20.

While the form of embodiment of the present invention as herein disclosed, constitutes a preferred form, it is to be understood that other forms might be adopted, all coming within the scope of the claims which follow.

What is claimed is as follows:

1. In a device of the character described, the combination with a member having a ball end; a fibrous covering for said ball end, said covering being impregnated with a lubricant; two substantially semi-spherically shaped shells fitting about the fibrous covering of the said ball end, said shells providing an opening through which the said member extends; and a link having a tubular end adapted to receive the shells, a portion of the tubular end being formed about the one shell to maintain the shell assembly within the link.

2. In a device of the character described, the combination with a tubular link having an enlarged end portion presenting a curved shoulder within the link and having a side opening; slots in the enlarged end of the link providing tangs; a member having a spherically shaped end adapted to be received by the enlarged portion of the link; a fibrous lining impregnated with a lubricant, fitting about the spherically shaped end of the said member; two semi-spherically shaped shells fitting about the fibrous covering on the member, said shells providing an opening through which said member extends, the tangs on the link being shaped about the one shell to urge it into clamping engagement with the fibrous covering and to maintain the shells within the link.

In testimony whereof I hereto affix my signature.

WILLIAM A. CHRYST.